July 7, 1931.  L. W. EGGLESTON  1,813,486
REFRIGERATING UNIT
Filed Nov. 8, 1928
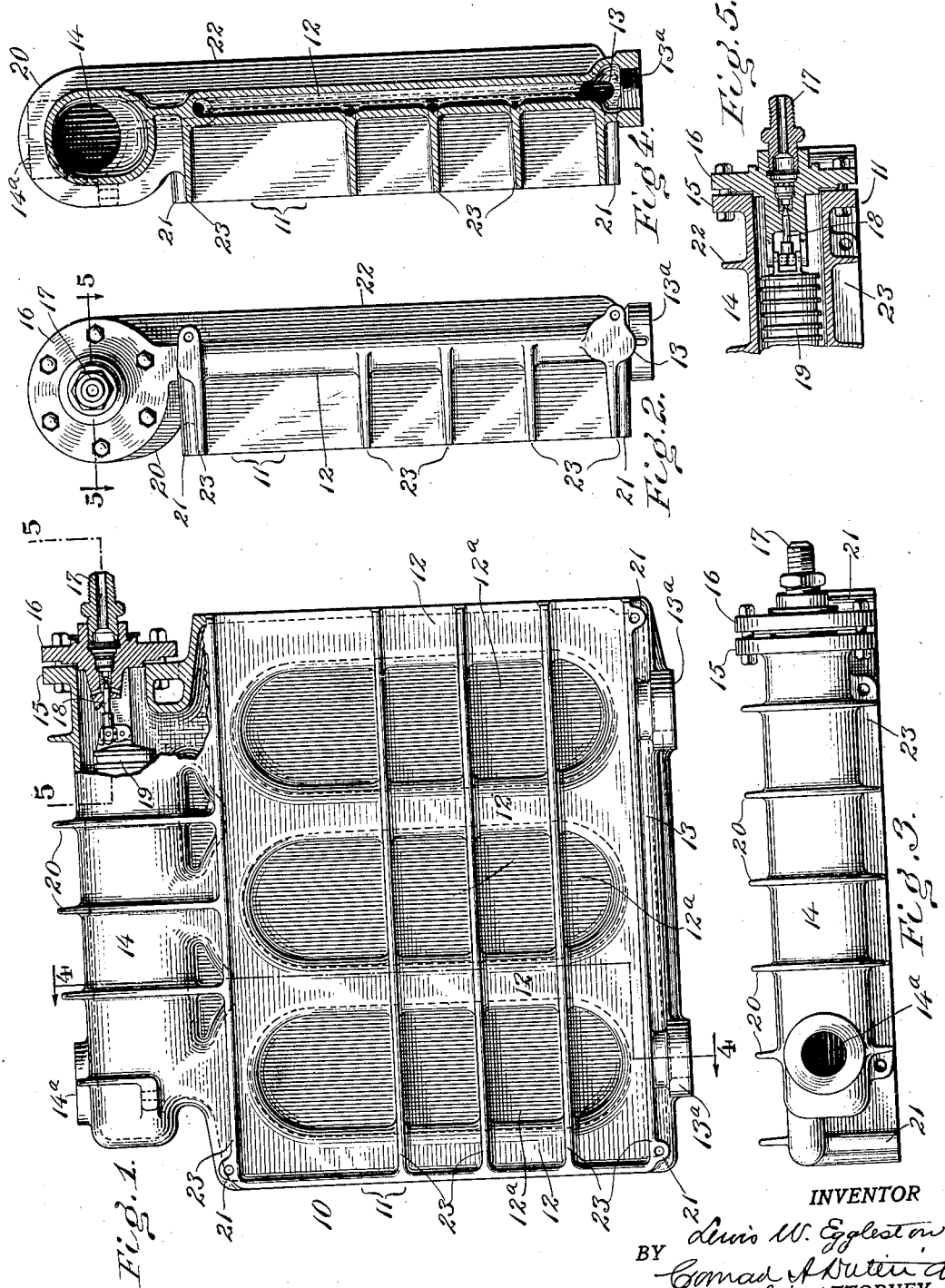
INVENTOR
Lewis W. Eggleston
BY Conrad A. Dieterich
his ATTORNEY Patented July 7, 1931

1,813,486

UNITED STATES PATENT OFFICE

LEWIS W. EGGLESTON, OF DETROIT, MICHIGAN, ASSIGNOR TO AMERICAN RADIATOR COMPANY, OF NEW YORK, N. Y., A CORPORATION OF NEW JERSEY

REFRIGERATING UNIT

Application filed November 8, 1928. Serial No. 317,948.

My invention relates to improvements in apparatus for refrigerating, cooling or the like, and the same has for its object more particularly to provide a simple, reliable and efficient apparatus which is extremely compact in form, inexpensive to produce and economical in operation.

Further, said invention has for its object to provide a refrigerating element in which the refrigerating agent will be more uniformly distributed and circulated throughout the element.

Further, said invention has for its object a refrigerating element or section having a float-chamber arranged at the top thereof coextensive in length with the length of said section and communicating with the body portion of said section at a plurality of points in its length.

Further, said invention has for its object to provide a refrigerating element or section having a series of vertical passages therein, and having a float-chamber, which contains the automatic control for the refrigerating agent, disposed along the upper longitudinal edge of the element or section and communicating at a plurality of points throughout its length severally with said passages in order to insure the uniform and effective distribution and circulation of the refrigerating agent in and through the element or section.

Further, said invention has for its object to provide a compact refrigerating element or section with its float chamber disposed longitudinally along the upper edge thereof and formed integrally therewith.

Other objects and advantages will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings forming part of this specification—

Figure 1 is a face view showing one form of refrigerating element or section constructed according to, and embodying my said invention;

Fig. 2 is an end view thereof;
Fig. 3 is a plain or top view;
Fig. 4 is a vertical section on the line 4—4 of Fig. 1, and
Fig. 5 is a detail longitudinal section on the line 5—5 of Fig. 1.

In said drawings 10 designates a refrigerating element or section preferably formed as a cast metal unit comprising a rectangular panel or body portion 11 provided with a series of vertical, parallel tubular portions 12 separated by intervening webs 12ª and forming passages communicating at their lower ends with a transverse header 13, and at their tops with a tubular, longitudinal float-chamber 14, substantially co-extensive in length with the length of said section, and provided at its base with openings communicating severally with the upper ends of the vertical passages in the tubular portions 12. The float-chamber 14 is open at one end and provided with a flanged portion 15 adapted to receive a cover-plate 16 having a coupling 17 at its outer end for connection with a source of refrigerating agent, and at its inner end with a suitable valve, as 18, controlled by a pivotally mounted float 19 for automatically controlling the admission of the refrigerating agent to the interior of the float-chamber and the body portion 11 of the element or section 10. The outer side of the float chamber 14 is provided with a series of spaced transverse ribs 20, serving as extended surface, and adjacent to its opposite ends said float-chamber is provided with bosses 21 to engage with correspondingly located bosses on a cooperating refrigerating element or section when a number thereof are assembled.

The lower transverse header 13 is provided on its under side adjacent to its ends with threaded apertures 13ª to receive the ends of flow or return pipes, or to permit of the assembling of a number of elements or sections vertically in end to end relation, and the float-chamber 14 is provided in its upper side with a threaded aperture 14ª to serve as an outlet under certain conditions of use.

The panel or body portion 11 is provided on one of its side walls with a series of vertical ribs 22 which merge at their upper ends with the transverse ribs 20 on the outer side of the float-chamber, and upon its opposite side the panel or body portion 11 is provided with a plurality of horizontal ribs 23, which in cooperation with correspondingly located ribs of an adjacent element or section or with other cooperating means, will constitute supports for the objects to be cooled.

The operation of the apparatus will be largely obvious. It need merely be noted that in operation the refrigerating fluid may, for example, be admitted to the element or section by way of the float-chamber 14 under control of the valve 18 and float 19. And that by disposing the float-chamber 14 horizontally, and having the same substantially coextensive in length with the length of the section it becomes possible to establish communication severally with the upper ends of the vertical passages 12 in the panel or body portion 11, and thereby effect the immediate and uniform distribution of the refrigerating agent, and insure the rapid and uniform cooling of the element or section as a whole.

Having thus described my said invention, what I claim and desire to secure by Letters Patent is:

A refrigerating unit formed as an integral casting comprising a body portion including a series of flat tubular portions arranged side by side in spaced relation, a header at one end of said body portion common to the lower ends of said tubular portions, a float-chamber at the opposite end of said body portion having openings therein communicating severally with said tubular portions, and a series of transverse ribs arranged in spaced relation and extending laterally from one side wall of said body portion intermediate said float-chamber and said header, and vertical ribs arranged in spaced relation and extending from the opposite side wall of said body portion, substantially as specified.

Signed at the city of Detroit, in the county of Wayne and State of Michigan, this 5th day of November, one thousand nine hundred and twenty-eight.

LEWIS W. EGGLESTON.